United States Patent
Shine et al.

(10) Patent No.: US 12,166,449 B2
(45) Date of Patent: *Dec. 10, 2024

(54) SYSTEM AND METHODS TO ADDRESS DRIVE TRAIN DAMPER OSCILLATIONS IN A GRID FORMING POWER GENERATING ASSET

(71) Applicant: General Electric Renovables Espana, S.L., Barcelona (ES)

(72) Inventors: Shan Shine, Bangalore (IN); Jishnu Kavil Kambrath, Kannur (IN); Kapil Jha, Bangalore (IN); Veena Padmarao, Bangalore (IN); Arvind Kumar Tiwari, Niskayuna, NY (US); Subbarao Tatikonda, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 76 days.

This patent is subject to a terminal disclaimer.

(21) Appl. No.: 18/081,112

(22) Filed: Dec. 14, 2022

(65) Prior Publication Data

US 2023/0110182 A1    Apr. 13, 2023

Related U.S. Application Data

(63) Continuation of application No. 17/146,549, filed on Jan. 12, 2021, now Pat. No. 11,545,920.

(51) Int. Cl.
*H02P 9/00* (2006.01)
*G05B 15/02* (2006.01)
(Continued)

(52) U.S. Cl.
CPC ............. *H02P 9/007* (2013.01); *G05B 15/02* (2013.01); *H02J 3/0012* (2020.01); *H02J 3/24* (2013.01);
(Continued)

(58) Field of Classification Search
CPC ... H02P 9/007; H02P 9/009; H02J 3/24; H02J 2300/28; H02K 7/183
See application file for complete search history.

(56) References Cited

U.S. PATENT DOCUMENTS 8,742,609 B2    6/2014  Helle et al.
9,160,266 B2   10/2015  Vath et al.
(Continued)

FOREIGN PATENT DOCUMENTS

CN    107017647 A    8/2017
CN    107769210 A    3/2018
(Continued)

OTHER PUBLICATIONS

Khan et al., Control of Bidirectional DC/DC Converter for Back to Back NPC-Based Wind Turbine System Under Grid Faults, Conference 2016 4th International Conference on Development in the in Renewable Energy Technology (ICDRET), Dhaka, Bangladesh, Jan. 2016, 4 Pages. (Abstract Only). https:/www.researchgate.net/publication/299508789_Control_of_Bidirectional_DCDC_Converter_for_Back_to_Back_NPC-based_Wind_Turbine_System_under_Grid_Faults DOI: 10.1109/ICDRET.2016.7421483.

*Primary Examiner* — Sean Gugger
(74) *Attorney, Agent, or Firm* — Dority & Manning, P.A.

(57) ABSTRACT

The system and method described herein provide gridforming control of a power generating asset having a double-fed generator connected to a power grid. Accordingly, a stator-frequency error is determined for the generator. The components of the stator frequency error are identified as a torsional component corresponding to a drivetrain
(Continued)

torsional vibration frequency and a stator component. Based on the stator component, a power output requirement for the generator is determined. This power output requirement is combined with the damping power command to develop a consolidated power requirement for the generator. Based on the consolidated power requirement, at least one control command for the generator is determined and an operating state of the generator is altered.

20 Claims, 5 Drawing Sheets (51) Int. Cl.
  *H02J 3/00* (2006.01)
  *H02J 3/24* (2006.01)
  *H02J 3/38* (2006.01)
  *H02J 13/00* (2006.01)
  *H02K 7/18* (2006.01)
(52) U.S. Cl.
  CPC ........ *H02J 3/381* (2013.01); *H02J 13/00002* (2020.01); *H02K 7/183* (2013.01); *H02P 9/006* (2013.01); *H02J 2300/28* (2020.01)

(56) References Cited

U.S. PATENT DOCUMENTS

| | | | |
|---|---|---|---|
| 9,467,082 | B2 | 10/2016 | Garcia |
| 9,667,057 | B2 | 5/2017 | Roesner et al. |
| 9,835,136 | B2 | 12/2017 | Haj-Maharsi |
| 9,899,941 | B1 | 2/2018 | Wang et al. |
| 10,113,533 | B2 | 10/2018 | Menke |
| 2009/0230689 | A1 | 9/2009 | Burra et al. |
| 2011/0222320 | A1 | 9/2011 | Delmerico et al. |
| 2012/0104754 | A1 | 5/2012 | Rudolf et al. |
| 2013/0015658 | A1 | 1/2013 | Vath et al. |
| 2015/0145251 | A1 | 5/2015 | Wagoner et al. |
| 2015/0381089 | A1* | 12/2015 | Tarnowski ................ H02J 3/32 290/44 |
| 2016/0069326 | A1* | 3/2016 | Menke ................ F03D 7/0296 290/44 |
| 2016/0285252 | A1 | 9/2016 | Burra et al. |
| 2018/0041155 | A1* | 2/2018 | Blackwelder ........... H02P 23/04 |

FOREIGN PATENT DOCUMENTS

| | | |
|---|---|---|
| CN | 108039843 B | 3/2020 |
| EP | 2481917 A1 | 8/2012 |
| WO | WO2004/107556 A1 | 12/2004 |

\* cited by examiner

FIG. 5

SYSTEM AND METHODS TO ADDRESS DRIVE TRAIN DAMPER OSCILLATIONS IN A GRID FORMING POWER GENERATING ASSET

RELATED APPLICATION

The present application is a continuation of U.S. application Ser. No. 17/146,549 filed on Jan. 12, 2021, which is incorporated herein by reference in its entirety.

FIELD

The present disclosure relates in general to grid forming power generating assets, and more particularly to systems and methods for addressing drive train damper oscillations in a grid forming power generating asset.

BACKGROUND

As disclosed herein, power generating assets may take a variety of forms and may include power generating assets which rely on renewable and/or nonrenewable sources of energy. Those power generating assets which rely on renewable sources of energy may generally be considered one of the cleanest, most environmentally friendly energy sources presently available. For example, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

As such, it may be desirable to operate asynchronous power generating assets, such as some wind turbines, as a grid-forming asset. Generally, grid-forming type converters may provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, the asynchronous power generating assets may share the burden of grid formation with other grid-forming sources, such as fossil-fuel-based generators, connected to the grid.

In addition to providing grid-forming power to the power grid, the power generating assets generally also must conform to certain grid requirements. For example, power generating assets may be required to offer fault-ride through (e.g. low-voltage ride through) capability. This requirement may mandate that a power generating asset stay connected to the power grid during one or more transient grid events, such as a grid fault. As used herein, the terms "grid fault," "fault," or similar are intended to cover a change in the magnitude of a grid voltage for a certain time duration. For example, when a grid fault occurs, the voltage of the system can decrease by a significant portion for a short duration (e.g., typically less than 500 milliseconds). In addition, grid faults may occur for variety of reasons, including but not limited to a phase conductor being connected to a ground (i.e. a ground fault), short-circuiting between phase conductors, lightning and/or windstorms, and/or accidental transmission line grounding.

In the past, the wind turbine may have been immediately disconnected in response to the voltage reduction, but as the power production of the wind turbines has increased as a percentage of the power of the power grid, the desirability for the wind turbines to remain online and ride through the transient grid events has increased. However, the voltage reduction of the transient grid event may result in the torque of the generator being significantly reduced while the rotational speed of the rotor may remain essentially unchanged. As such, when the grid voltage returns to pre-fault levels, a mismatch between the torque of the generator and the inertia of the rotor may result in undesirable torsional vibrations in the drivetrain of the wind turbine. The torsional vibrations may manifest as oscillations in the power produced by the wind turbine which exceed certain power grid limits.

Typically, power generating assets may be equipped with damping systems, such as drivetrain dampers, which may generate a generator setpoint configured to rapidly damp the oscillations resulting from the transient grid event. However, when operating as a grid-forming asset, the commands from the damping system may interfere with, or be negated by, the setpoint commands of the power generating asset seeking to develop the grid voltage and frequency required to form the grid power.

Thus, the present disclosure is directed to a system and method for addressing drivetrain damper oscillations while providing grid-forming control to the power grid to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming control of a double-fed generator connected to a power grid. The method may include determining, via a frequency module of the controller, a stator-frequency error for the generator. The method may also include determining, via a controller shaping module of the frequency module, a torsional component and a stator component of the stator-frequency error. The torsional component may correspond to a drivetrain torsional vibration frequency. Additionally, the method may include determining, via the frequency module, a power output requirement for the generator based, at least in part, on the stator component of the stator-frequency error. The power output requirement may be combined, via the frequency module, with a damping power command to develop a consolidated power requirement for the generator. The damping power command may be generated in response to the torsional vibration frequency. Based, at least in part, on the consolidated power requirement, the controller may determine at least one control command for the generator. Additionally, the method may include changing an operating state of the generator in response to the control command(s) so as to output a grid-forming voltage and frequency.

In an embodiment, the stator-frequency error may include a difference between a reference frequency and a stator-output frequency.

In an additional embodiment, determining the control command(s) for the generator may include determining, via the controller, a rotor voltage setpoint based, at least in part, on the consolidated power requirement.

In a further embodiment, the method may include monitoring, via the controller, a three-phase stator voltage and current of the generator. Additionally, the method may include transforming the three-phase stator voltage and current via an abc-to-dq transfer module of the controller to a d-q reference frame so as to determine a d-component and a q-component for the current and voltage. The method may also include determining, via a phase locked loop module of the controller, the stator-output frequency based on the d-component of the stator voltage.

In yet a further embodiment, the stator component of the stator-output frequency may include a direct current (DC) value and the torsional component of the stator-output frequency may include a sinusoidal frequency.

In an embodiment, determining the torsional component and the stator component of the stator-frequency error may also include establishing, via the frequency module, a gain value of zero at the torsional vibration frequency, and establishing, via the frequency module, a non-zero gain value for values of the stator-frequency error which do not correspond to the torsional vibration frequency.

In an additional embodiment, the non-zero gain value may have a maximal value when the stator-frequency error has a minimal value and may decrease with an increase in the stator-frequency error.

In a further embodiment, the method may include determining, via a voltage module of the controller, a stator-voltage error for the generator. The stator-voltage error may include a difference between a reference voltage and a stator-output voltage. The stator-output voltage may be the q-component of the stator voltage. Additionally, the method may include determining, via the voltage module, a required rotor voltage d-component based, at least in part, on the stator-voltage error.

In yet a further embodiment, determining the control command(s) for the generator may include determining, via the frequency module, a required rotor voltage q-component based, at least in part, on the consolidated power requirement. Additionally, the method may include combining, via a dq-to-abc transform module of the controller, the required rotor voltage d-component and the required rotor voltage q-component to generate a rotor voltage setpoint.

In yet a further embodiment, the method may include receiving, via the controller, the reference frequency. The reference frequency may correspond to an output frequency of the generator required to support the frequency of the power grid. Additionally, the method may include receiving, via the controller, the reference voltage. The reference voltage may correspond to an output voltage magnitude of the generator required to support the power grid.

In an embodiment, the damping power command may be generated by a drivetrain-damping module configured to damp torsional vibrations resulting from a transient grid event.

In an additional embodiment, the method may include detecting, via the controller, an oscillation in a power output of the wind turbine during a transient-event recovery phase following the transient grid event. In response to detecting the oscillation, the method may include storing at least a portion of the oscillatory power in an energy storage device operably coupled to the generator.

In another aspect, the present disclosure is directed to a system for operating a power generating asset so as to provide grid forming control. The system may include a double-fed generator connected to a power grid, and a controller communicatively coupled to the power converter. The controller may include at least one processor and a plurality of modules configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for providing grid-forming control of a double-fed generator of a power generating asset connected to a power grid. In particular, the systems and methods disclosed herein may be employed to address coordinate the damping of drivetrain oscillations while still providing the grid frequency and voltage required for grid forming. When configured to support grid forming, as opposed to being grid-following, a power generating asset may be provided with a reference (e.g. target) frequency and voltage for the power output of the power generating asset.

In order to provide the required frequency and/or voltage, a controller may, via a number of modules, compare a frequency of the stator output to the reference frequency and/or the stator voltage to the reference voltage. When the stator frequency and/or the stator voltage deviate from the corresponding reference value, the controller may generate a setpoint command. The setpoint command may affect the rotor of the generator thereby the output of the stator to bring the output into alignment with the reference frequency so as to support grid forming.

In addition to supporting grid forming, when the power generating asset encounters a transient grid event, a torsional vibration may develop during a recovery phase. It may be desirable to damp the torsional vibration to limit power fluctuations in the power delivered to the grid. In order to damp the torsional vibration, the power generating asset may be equipped with a module, such as a drivetrain-damping module which may generate a torque set point (e.g. a damping power command) for the generator in response to the detection of a transient grid event.

The torsional vibration may, however, be reflected in the stator-output frequency. As the controller may be configured to provide grid-forming control, which may be based on the deviation in the frequency relative to the reference frequency, the controller may establish at least one control command in reaction to the detected frequency deviation. As such, without the employment of the systems and methods disclosed herein, the controller may generate at least one control command which may conflict with, override, and/or negate the torque setpoint generated by the drivetrain-damping module. Such an interaction may result in the inadequate damping of the torsional vibration.

To facilitate the integration of the damping power command(s) related to the damping of the torsional vibration with the control command(s) directed at providing the grid forming frequency, the systems and methods disclosed herein may determine a frequency error corresponding differences between the reference frequency and the stator frequency. The controller may then determine the portion of the frequency error attributed to the torsional vibration (e.g. a torsional component to be damped by the damping module) and the portion attributable to the stator (e.g. a stator component to be brought into alignment with the reference frequency). A power output requirement may be determined based on the stator component of the frequency error. Once the power output requirement is determined based on stator component of the frequency error, the damping power command from the damping module may be added to the power output requirement to produce a consolidated power requirement for the generator. The controller may then utilize the consolidated power requirement to determine the control command(s) for the generator. It should be appreciated that combining of the damping power command with the power output requirement based on the stator component may preclude any conflict, overriding, and/or negation of the damping power command by the control command(s).

Figure 1:
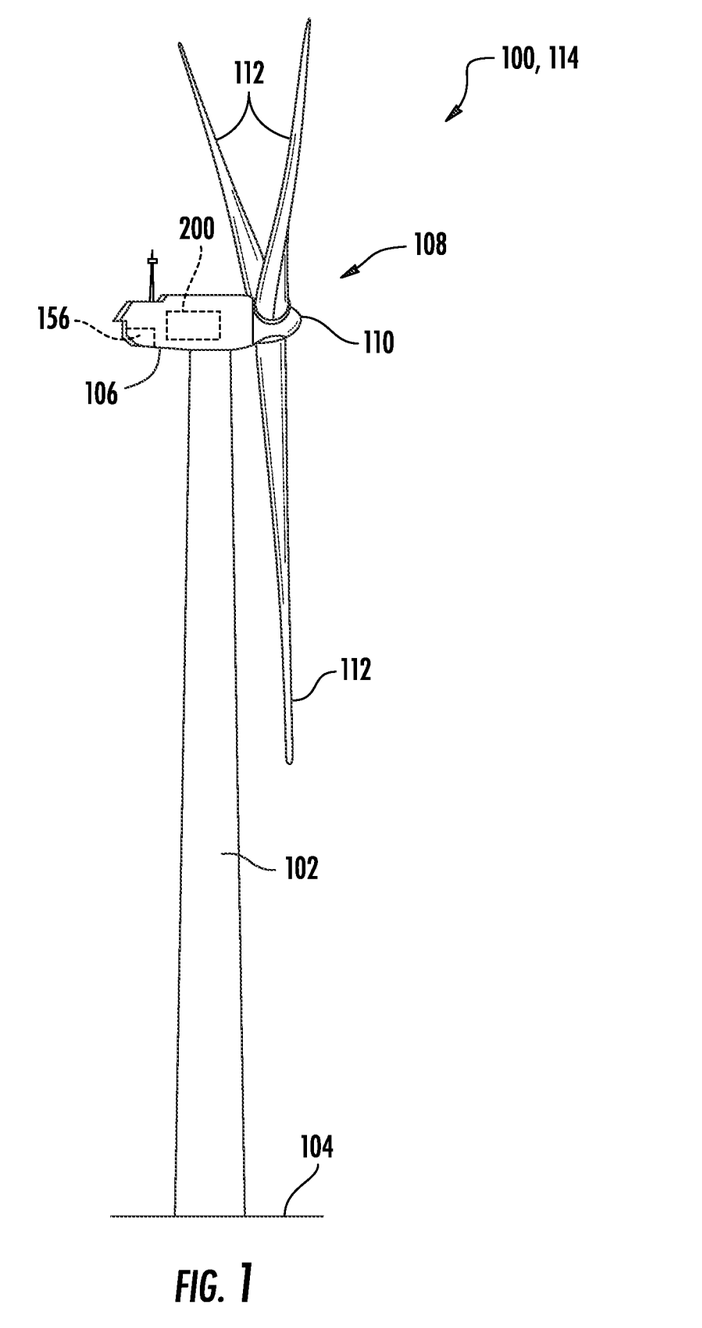
FIG. 1 illustrates a perspective view of one embodiment of a power generating asset configured as a wind turbine according to the present disclosure.

Referring now to the drawings, FIG. 1 illustrates a perspective view of one embodiment of a power generating asset 100 according to the present disclosure. As shown, the power generating asset 100 may be configured as a wind turbine 114. In an additional embodiment, the power generating asset 100 may, for example, be configured as a solar power generating asset, a hydroelectric plant, a fossil fuel generator, and/or a hybrid power generating asset.

When configured as a wind turbine 114, the power generating asset 100 may generally include a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 400 (FIG. 2) positioned within the nacelle 106 to permit electrical energy to be produced.

The wind turbine 114 may also include a controller 200 centralized within the nacelle 106. However, in other embodiments, the controller 200 may be located within any other component of the wind turbine 114 or at a location outside the wind turbine. Further, the controller 200 may be communicatively coupled to any number of the components of the wind turbine 114 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
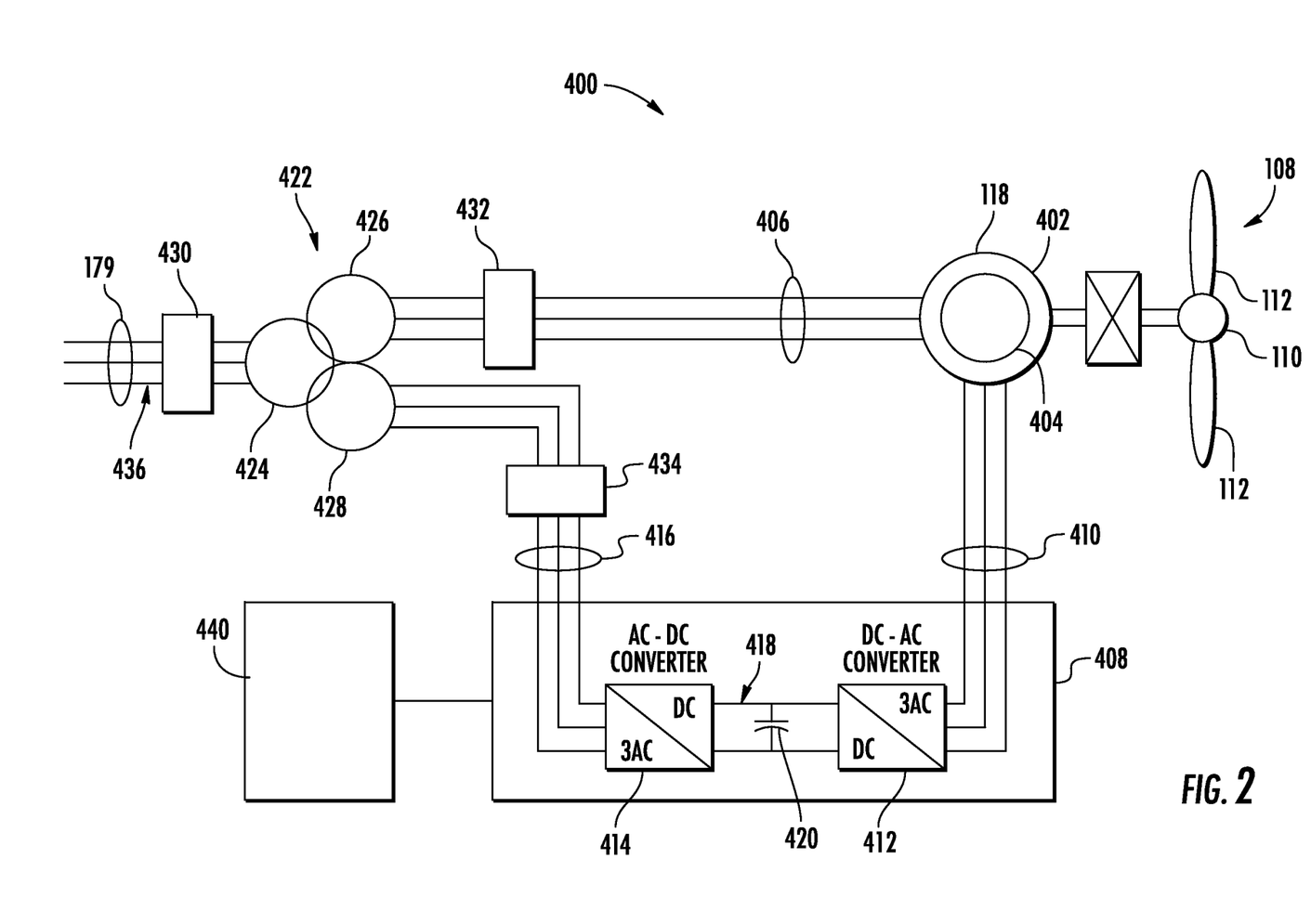
FIG. 2 illustrates a schematic diagram of one embodiment of an electrical system for use with the power generating asset according to the present disclosure.

Referring now to FIG. 2, wherein an exemplary electrical system 400 of the power generating asset 100 is illustrated. As shown, the generator 118 may be coupled to the rotor 108 for producing electrical power from the rotational energy generated by the rotor 108. Accordingly, in an embodiment, the electrical system 400 may include various components for converting the kinetic energy of the rotor 108 into an electrical output in an acceptable form to a connected power grid 179. For example, in an embodiment, the generator 118 may be a doubly-fed induction generator (DFIG) having a stator 402 and a generator rotor 404. The generator 118 may be coupled to a stator bus 406 and a power converter 408 via a rotor bus 410. In such a configuration, the stator bus 406 may provide an output multiphase power (e.g. three-phase power) from a stator of the generator 118, and the rotor bus 410 may provide an output multiphase power (e.g. three-phase power) of the generator rotor 404 of the generator 118. Additionally, the generator 118 may be coupled via the rotor bus 410 to a rotor side converter 412. The rotor side converter 412 may be coupled to a line-side converter 414 which, in turn, may be coupled to a line-side bus 416.

In an embodiment, the rotor side converter 412 and the line-side converter 414 may be configured for normal operating mode in a three-phase, pulse width modulation (PWM) arrangement using insulated gate bipolar transistors (IGBTs) as switching devices 438. Other suitable switching devices may be used, such as insulated gate commuted thyristors, MOSFETs, bipolar transistors, silicone-controlled rectifiers, and/or other suitable switching devices. The rotor side converter 412 and the line-side converter 414 may be coupled via a DC link 418 across a DC link capacitor 420.

In an embodiment, the power converter 408 may be coupled to the controller 200 configured as a converter controller 202 to control the operation of the power converter 408. For example, the converter controller 202 may send control commands to the rotor side converter 412 and the line-side converter 414 to control the modulation of switching elements used in the power converter 408 to establish a desired generator torque setpoint and/or power output.

As further depicted in FIG. 2, the electrical system 400 may, in an embodiment, include a transformer 422 coupling the power generating asset of 100 to the power grid 179 via a point of interconnect (POI) 436. The transformer 422 may, in an embodiment, be a 3-winding transformer which includes a high voltage (e.g. greater than 12 KVAC) primary winding 424. The high voltage primary winding 424 may be coupled to the power grid 179. The transformer 422 may also include a medium voltage (e.g. 6 KVAC) secondary winding 426 coupled to the stator bus 406 and a low voltage (e.g. 575 VAC, 690 VAC, etc.) auxiliary winding 428 coupled to the line bus 416. It should be appreciated that the transformer 422 can be a three-winding transformer as depicted, or alternatively, may be a two-winding transformer having only a primary winding 424 and a secondary winding 426; may be a four-winding transformer having a primary winding 424, a secondary winding 426, and auxiliary winding 428, and an additional auxiliary winding; or may have any other suitable number of windings.

In an embodiment, the electrical system 400 may include various protective features (e.g. circuit breakers, fuses, contactors, and other devices) to control and/or protect the various components of the electrical system 400. For example, the electrical system 400 may, in an embodiment, include a grid circuit breaker 430, a stator bus circuit breaker 432, and/or a line bus circuit breaker 434. The circuit breaker(s) 430, 432, 434 of the electrical system 400 may connect or disconnect corresponding components of the electrical system 400 when a condition of the electrical system 400 approaches a threshold (e.g. a current threshold and/or an operational threshold) of the electrical system 400.

As depicted in FIG. 1, in an embodiment, the power generating asset 100 may include at least one operational sensor 156. The operational sensor(s) 156 may be configured to detect a performance of the power generating asset 100, e.g. in response to the environmental condition. In an embodiment, the operational sensor(s) 156 may be configured to monitor a plurality of electrical conditions, such as slip, stator voltage and current, rotor voltage and current, line-side voltage and current, DC-link charge and/or any other electrical condition of the power generating asset.

It should also be appreciated that, as used herein, the term "monitor" and variations thereof indicates that the various sensors of the power generating asset 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the power generating asset 100.

Figure 3:
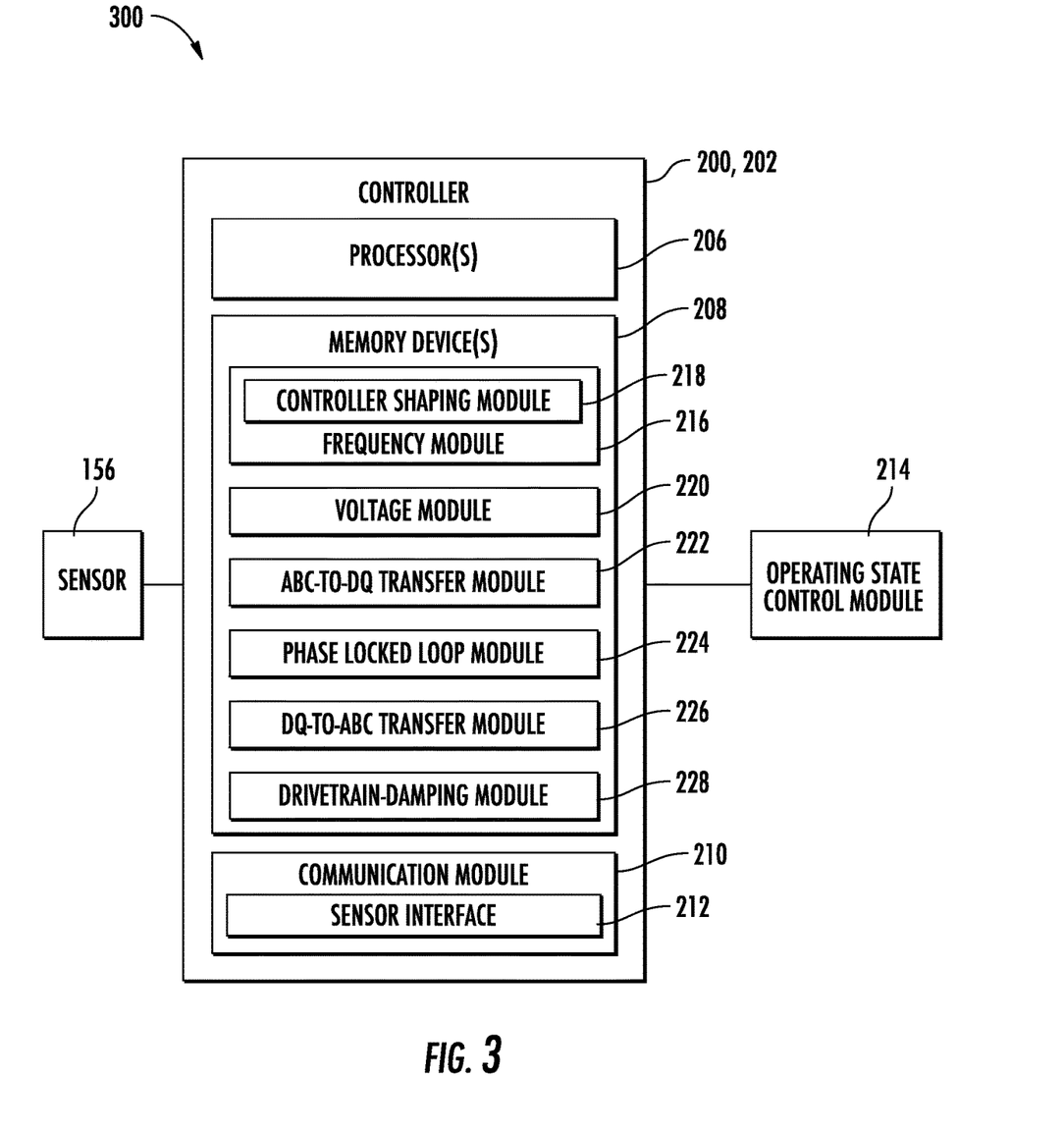
FIG. 3 illustrates a block diagram of one embodiment of a controller for use with the power generating asset according to the present disclosure.
Figure 4:
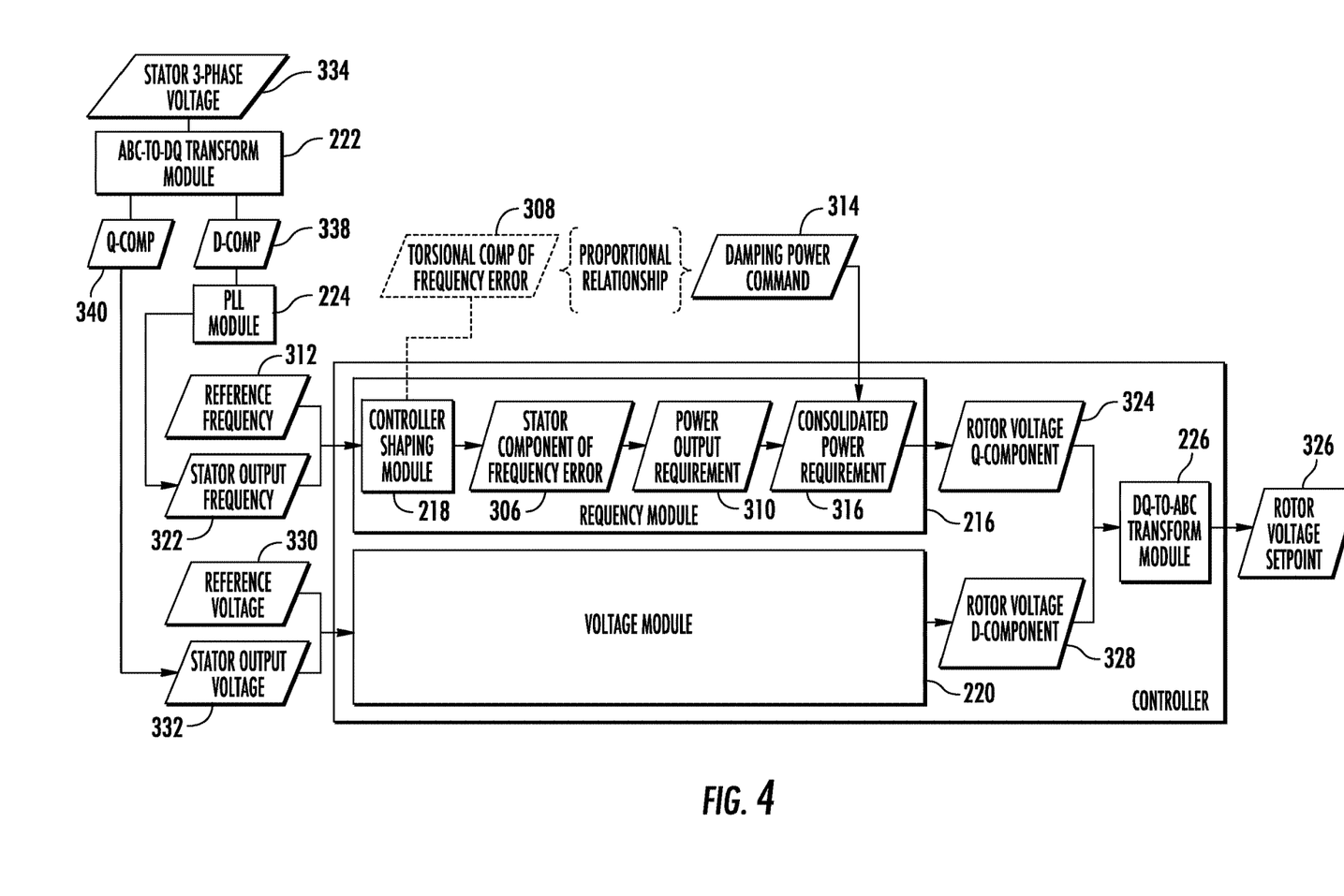
FIG. 4 illustrates a control architecture for one embodiment of a control logic for operating the power generating asset according to the present disclosure.
Figure 5:
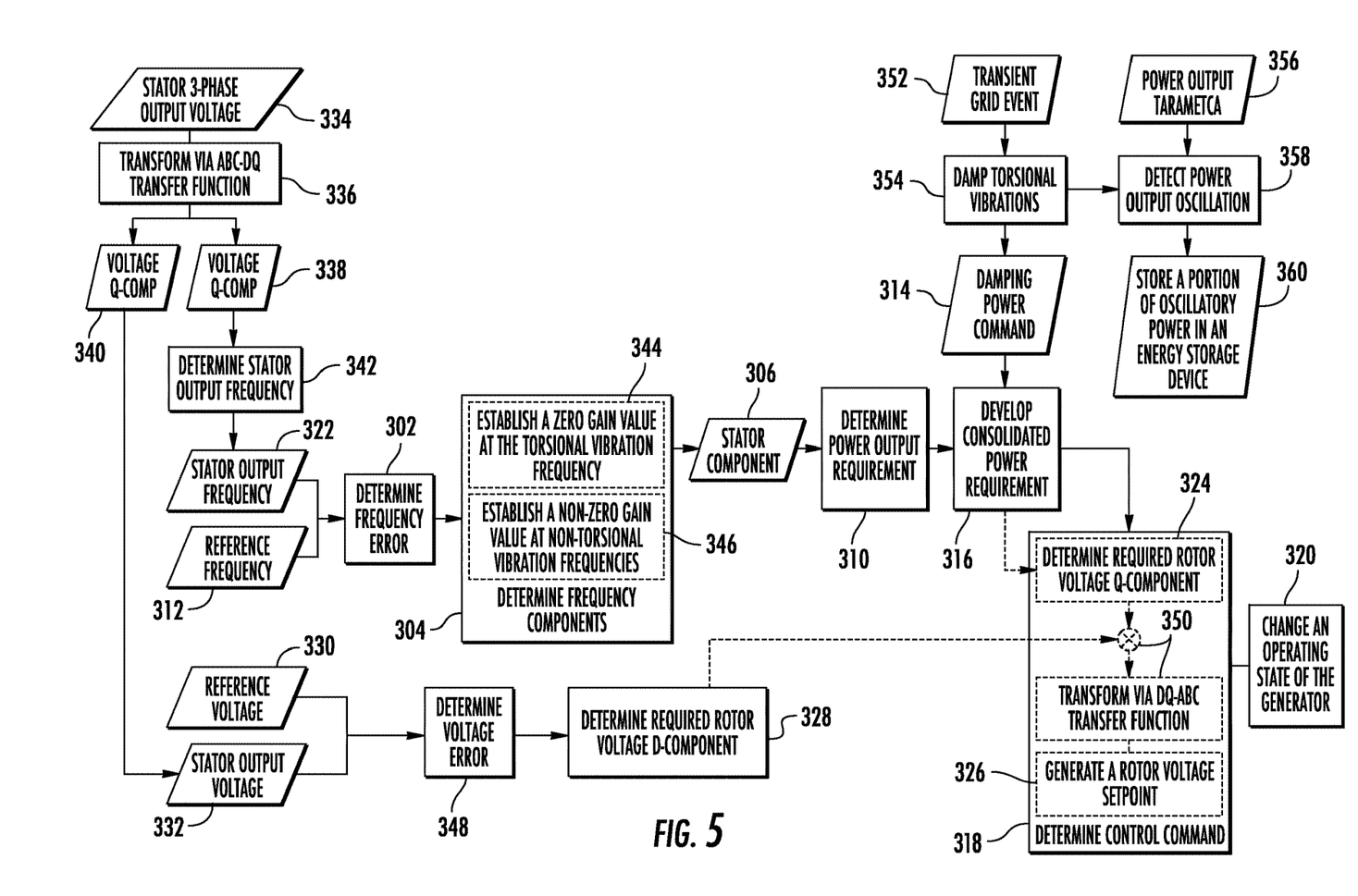
FIG. 5 illustrates a flow diagram of one embodiment of the control logic of FIG. 4 according to the present disclosure.

Referring to FIGS. 3-5, multiple embodiments of a system 300 for providing grid-forming control of the generator 118 of the power generating asset 100 according to the present disclosure are presented. As shown particularly in FIG. 3, a schematic diagram of one embodiment of suitable components that may be included within the system 300 is illustrated. For example, as shown, the system 300 may include the controller 200 communicatively coupled to the sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the power generating asset 100. Further, the communications module 210 may include a sensor interface 212 (e.g., one or more analog-to-digital converters) to permit signals transmitted from the sensor(s) 156 to be converted into signals that can be understood and processed by the processors 206. It should be appreciated that the sensor(s) 156 may be communicatively coupled to the communications module 210 using any suitable means. For example, the sensor(s) 156 may be coupled to the sensor interface 212 via a wired connection. However, in other embodiments, the sensor(s) 156 may be coupled to the sensor interface 212 via a wireless connection, such as by using any suitable wireless communications protocol known in the art. Additionally, the communications module 210 may also be operably coupled to an operating state control module 214 configured to change at least one turbine operating state of the power generating asset 100, such as an operating state of the generator 118.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, determining a power output requirement for the generator 118 based on the stator component of the stator-frequency error and combining the power output requirement with a damping power command to generate a consolidated power requirement for the generator 118 as described herein, as well as various other suitable computer-implemented functions.

In an embodiment, the controller 200 may employ a frequency module 216 to develop the required frequency component of the grid-forming control. For example, the frequency module 216 may receive a reference frequency 312 and a stator-output frequency 322. The reference frequency 312 may correspond to the frequency of the power output of the power generating asset 100 necessary to provide the required grid-forming (e.g., the output frequency of the generator 118 required to support the frequency of the power grid 179). A difference between the reference frequency 312 and the stator-output frequency 322 may be utilized to determine a stator-frequency error 302 a required power output for the stator 402. The required power output may be converted to a component of current and compared to a corresponding current component for the stator 402. In an embodiment, the frequency module 216 may utilize the comparison of the current component to the corresponding current component of the stator 402 to develop a rotor voltage q-component 324, which may be utilized to generate such a rotor voltage setpoint 326 as may be necessary to deliver the required grid-forming control.

In an additional embodiment, the controller 200 may employ a voltage module 222 determine a rotor voltage d-component 328 corresponding to a difference between a reference voltage 330 and a stator-output voltage 332. The reference voltage 330 may correspond to the voltage of the power output of the power generating asset 100 necessary to provide the required grid-forming (e.g., the output voltage magnitude of the generator 118 required to support the power grid 179). In an embodiment, the difference between the reference voltage 330 and the stator-output voltage 332 may be utilized to determine a reference reactive power for the stator 402 of the generator 118. The reference reactive power may be converted to a component of current and compared to a corresponding current component for the stator 402. In an embodiment, the voltage module 222 may utilize the comparison of the current components to develop the rotor voltage d-component 328. In an embodiment, the rotor voltage d-component 328 and the rotor voltage q-component 324 may be combined to generate the rotor voltage setpoint 326 necessary for the delivery of grid-forming control.

In an embodiment, the controller 200 may employ the frequency module 216 to determine a stator-frequency error 302 for the generator 118. As depicted at 304, in an embodiment, a controller shaping module 218 of the frequency module 216 may be employed by the system 300 to determine the frequency components of the stator-frequency error 302. Accordingly, the controller shaping module 218 may determine at least a stator component 306 of the stator-frequency error 302. For example, in an embodiment, the controller shaping module 218 may identify and/or filter out a torsional component 308 of the stator-frequency error 302, therefore determining the stator component 306. Based on the stator component 306 of the stator-frequency error 302, the frequency module 216 may determine a power output requirement 310 for the generator 118. The frequency module 216 may combine the power output requirement 310 with a damping power command 314, which may be generated in response to the drivetrain torsional vibration frequency 344, to develop a consolidated power requirement 316 for the generator 118. The controller 200 may, in an embodiment, determine at least one control command 318 for the generator 118 based, at least in part, on the consolidated power requirement 316. For example, in an embodiment, determining the control command(s) 318 may include determining the rotor voltage setpoint 326 based, at least in part, on the consolidated power requirement 316. In response to the control command(s) 318 (e.g. the rotor voltage setpoint 326), an operating state 320 of the generator may be changed/altered in order to output a grid-forming voltage and frequency.

As previously mentioned, in an embodiment, the system 300 may employ the frequency module 216 to determine a difference between the reference frequency for the generator 118 (e.g. the reference frequency for the stator 402 desirable for grid-forming) and the actual stator-output frequency 322. In an embodiment, the stator-output frequency 322 may be obtained directly from the operational sensor(s) 156 and/or computed from additional parameters of the power generating asset 100 monitored by the operational sensor(s) 156.

In an embodiment, wherein the stator-output frequency 322 may be computed, the controller 200 may monitor a three-phase stator voltage 334. The three-phase stator voltage 334 may be expressed in terms of an abc-reference frame. As depicted at 336, the controller 200 may employ an abc-to-dq transfer module 222, to transform the three-phase stator voltage/current 334 from the abc-reference frame to a dq-reference frame. The transformation at step 336 may determine a d-component 338 and a q-component 340 for the stator current/voltage.

As disclosed herein, the controller 200 may, in an embodiment, include a phase locked loop module 224. As depicted at 342, the system 300 may, thus, employ the phase locked loop module 224 to determine the stator-output frequency 322. In such an embodiment, the stator-output frequency 322 may be based on the d-component 338 of the three-phase stator voltage 334.

In an embodiment the stator component 306 of the stator-output frequency 322 may be a DC value. However, in an embodiment wherein a torsional vibration 354 may be reflected in the stator-output frequency 322, the torsional component 308 of the frequency error 302 may have a sinusoidal frequency. Accordingly, in an embodiment, to determine the stator component 306 of the stator-frequency error 302, the frequency module 216 (via the controller shaping module 218) may, establish a gain value of zero at the torsional vibration frequency 344. Similarly, as depicted at 346, the frequency module 216 may establish a non-zero gain value for values of the stator-frequency error which do not correspond to the torsional vibration frequency 344.

In an embodiment, the non-zero gain value may have a maximal value when the stator-frequency error 302 has a minimal value and may decrease with an increase in the stator-frequency error 302. For example, in an embodiment wherein the difference between the reference frequency 312 and the stator-output frequency 322 is relatively minor, a high likelihood may exist that the stator-output frequency 322 may be out of phase with the reference frequency 312. In such an embodiment, it may be desirable to modify the rotor voltage setpoint 326 so as to bring the power output of the generator 118 into alignment with the required grid-forming parameters. However, a large difference between the frequencies 312, 322 may indicate an increased likelihood that at least a portion of the stator-frequency error 302 should be damped or addressed via other control actions.

It should be appreciated that the torsional vibration frequency 344 may be a known value for the power generating asset 100 based on the structural and/or material characteristics of the power generating asset 100. It should further be appreciated that the establishment of a gain value of zero at the torsional vibration frequency 344 may preclude the utilization of the torsional vibration frequencies 344 for the determination of the power output requirement 310 for the stator 402.

In addition to the utilization of the frequency module, the system 300 may also include the voltage module 220. Accordingly, in an embodiment, the voltage module 220 may be utilized to determine a stator-voltage error 348 for the generator 118. The stator-voltage error 348 may correspond to a difference between the reference voltage 330 and the stator-output voltage 332. In an embodiment, the stator-output voltage may be the q-component 340 of the three-phase stator voltage 334. Additionally, the voltage module 220 may determine the required voltage d-component 328 based, at least in part, on the stator-voltage error 348.

As disclosed herein, in order to determine the control command(s) 318, the system 300 may, via the frequency module 216, determine the rotor voltage q-component 324 based, at least in part, on the consolidated power requirement 316. In an embodiment, rotor voltage q-component 324 determined by the frequency module 216 may be combined with the rotor voltage d-component 328 determined by the voltage module 220. For example, in an embodiment, the rotor voltage q-component 324 and the rotor voltage d-component 328 may be combined via a dq-to-abc transform module 226 of the controller 200. As depicted at 350, the dq-to-abc transform module 226 may combine and transform the rotor voltage q-component 324 and the rotor voltage d-component 328 to generate the rotor voltage setpoint 326 expressed in the abc-reference frame.

In an embodiment, the system 300 may include a drivetrain-damping module 228. As such, in an embodiment wherein the controller 200 detects, for example, a transient grid event 352, the drivetrain-damping module 228 may be configured to damp any resulting torsional vibrations 354. In order to damp the torsional vibrations 354, the drivetrain-damping module 228 may generate a damping power command 314. The damping power command 314 may, for example, establish an increased torque setpoint for the generator 118 relative to a torque setpoint prior to the transient grid event 352. It should be appreciated that the damping power command 314 may have a proportional relationship to the torsional component 308 of the frequency error 302.

It should further be appreciated that the damping power command 314 may be directed to achieving the desired level of damping without consideration for the reference frequency 312. As such, the development of the consolidated power requirement 316 via the addition of the power output requirement 310 (based on the stator component 306 of the frequency error 302) and the damping power command 314 (determined based on a damping requirement of the torsional vibrations 354) may facilitate the simultaneous addressing of both the grid-forming control requirements and the damping requirements of the power generating asset 100.

In an additional embodiment, the controller 200 may be configured to receive data indicative of a power output parameter 356 of the power generating asset 100. Based on the power output parameter 356, the controller 200 may detect a power output oscillation 358 in the power output of the power generating asset 100 during a transient-event recovery phase following the transient grid event 352. As depicted at 360, in response to detecting the power output oscillation 358, the controller 200 may be configured to store at least a portion of the oscillatory power in an energy storage device 440 operably coupled to the generator 118. For example, in an embodiment, the controller 200 may store a portion of the oscillatory power exceeding a pre-transient event power level so as to preclude the transmission of the oscillatory power to the power grid 179.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for providing grid-forming control of a double-fed generator connected to a power grid, the method comprising: determining, via a frequency module of the controller, a stator-frequency error for the generator; determining, via a controller shaping module of the frequency module, a torsional component and a stator component of the stator-frequency error, wherein the torsional component corresponds to a drivetrain torsional vibration frequency; determining, via the frequency module, a power output requirement for the generator based, at least in part, on the stator component of the stator-frequency error; combining, via the frequency module, the power output requirement with a damping power command to develop a consolidated power requirement for the generator, wherein the damping power command is generated in response to the drivetrain torsional vibration frequency; determining, via the controller, at least one control command for the generator, based, at least in part, on the consolidated power requirement; and changing an operating state of the generator in response to the at least one control command so as to output a grid-forming voltage and frequency.

Clause 2. The method of clause 1, wherein the stator-frequency error comprises a difference between a reference frequency and a stator-output frequency.

Clause 3. The method of any preceding clause, wherein determining the at least one control command for the generator further comprises: determining, via the controller, a rotor voltage setpoint based, at least in part, on the consolidated power requirement.

Clause 4. The method of any preceding clause, further comprising: monitoring, via the controller, a three-phase stator voltage and current of the generator; and transforming the three-phase stator voltage and current via an abc-to-dq transfer module of the controller to a d-q reference frame so as to determine a d-component and a q-component for the current and voltage; and determining, via a phase locked loop module of the controller, the stator-output frequency.

Clause 5. The method of any preceding clause, wherein the stator component of the stator-output frequency comprises a DC value, and wherein the torsional component of the stator-output frequency comprises a sinusoidal frequency.

Clause 6. The method of any preceding clause, wherein determining the torsional component and the stator component of the stator-frequency error further comprises: establishing, via the frequency module, a gain value of zero at the torsional vibration frequency; and establishing, via the frequency module, a non-zero gain value for values of the stator-frequency error which do not correspond to the torsional vibration frequency.

Clause 7. The method of any preceding clause, wherein the non-zero gain value has a maximal value when the stator-frequency error has a minimal value and decreases with an increase in the stator-frequency error.

Clause 8. The method of claim 4, further comprising: determining, via a voltage module of the controller, a stator-voltage error for the generator, the stator-voltage error comprising a difference between a reference voltage and a stator-output voltage, wherein the stator-output voltage is the q-component of the stator voltage; and determining, via the voltage module, a required rotor voltage d-component based, at least in part, on the stator-voltage error.

Clause 9. The method of any preceding clause, wherein determining the at least one control command for the generator further comprises: determining, via the frequency module, a required rotor voltage q-component based, at least in part, on the consolidated power requirement; and combining, via a dq-to-abc transform module of the controller, the required rotor voltage d-component and the required rotor voltage q-component to generate a rotor voltage setpoint.

Clause 10. The method of any preceding clause, further comprising: receiving, via the controller, the reference frequency, wherein the reference frequency corresponds to an output frequency of the generator required to support the frequency of the power grid; and receiving, via the controller, the reference voltage, wherein the reference voltage corresponds to an output voltage magnitude of the generator required to support the power grid.

Clause 11. The method of any preceding clause, wherein the damping power command is generated by a drivetrain-damping module configured to damp torsional vibrations resulting from a transient grid event.

Clause 12. The method of any preceding clause, further comprising: detecting, via the controller, an oscillation in a power output of a power generating asset during a transient-event recovery phase following the transient grid event; and in response to detecting the oscillation, storing at least a portion of the oscillatory power in an energy storage device operably coupled to the generator.

Clause 13. A system for operating a power generating asset so as to provide grid forming control, the system comprising: a double-fed generator connected to a power grid; and a controller communicatively coupled to the generator, the controller comprising at least one processor and a plurality of modules configured to perform a plurality of operations, the plurality of operations comprising: determining, via a frequency module of the controller, a stator-frequency error for the generator, wherein the stator-frequency error comprises a difference between a reference frequency and a stator-output frequency; determining, via a controller shaping module of the frequency module, a torsional component and a stator component of the stator-frequency error, wherein the torsional component corresponds to a drivetrain torsional vibration frequency; determining, via the frequency module, a power output requirement for the generator based, at least in part, on the stator component of the stator-frequency error; combining, via the frequency module, the power output requirement with a damping power command to develop a consolidated power requirement for the generator, wherein the damping power command is generated in response to the drivetrain torsional vibration frequency; determining at least one control command for the generator, based, at least in part, on the consolidated power requirement; and changing and operating state of the generator in response to the at least one control command so as to output a grid-forming voltage and frequency.

Clause 14. The system of any preceding clause, wherein determining the at least one control command for the generator further comprises: determining a rotor voltage setpoint based, at least in part, on the consolidated power requirement.

Clause 15. The system of any preceding clause, wherein the plurality of operations further comprise: monitoring a three-phase stator voltage and current of the generator; transforming the three-phase stator voltage and current via an abc-to-dq transfer module of the controller to a d-q reference frame so as to determine a d-component and q-component for the current and voltage; and determining, via a phase locked loop module of the controller, the stator-output frequency.

Clause 16. The system of any preceding clause, wherein the stator component of the stator-output frequency comprises a DC value, and wherein the torsional component of the stator-output frequency comprises a sinusoidal frequency.

Clause 17. The system of any preceding clause, wherein determining the torsional component and the stator component of the stator-frequency error further comprises: establishing, via the frequency module, a zero gain value at the torsional vibration frequency; and establishing, via the frequency module, a non-zero gain value for values of the stator-frequency error which do not correspond to the torsional vibration frequency.

Clause 18. The system of any preceding clause, wherein the plurality of operations further comprise: determining, via a voltage module of the controller, a stator-voltage error for the generator, the stator-voltage error comprising a difference between a reference voltage and a stator-output voltage, wherein the stator-output voltage is the q-component of the stator voltage; and determining, via the voltage module, a required rotor voltage d-component based, at least in part, on the stator-voltage error.

Clause 19. The system of any preceding clause, wherein determining the at least one control command for the generator further comprises: determining, via the frequency module, a required rotor voltage q-component based, at least in part, on the consolidated power requirement; and combining, via a dq-to-abc transform module of the controller, the required rotor voltage d-component and the required rotor voltage q-component to generate a rotor voltage setpoint.

Clause 20. The system of any preceding clause, wherein the plurality of operations further comprise: receiving the reference frequency, wherein the reference frequency corresponds to an output frequency of the generator required to support the frequency of the power grid; and receiving the reference voltage, wherein the reference voltage corresponds to an output voltage magnitude of the generator required to support the power grid.

What is claimed is:

1. A method for providing grid forming control of a power generating asset connected to a power grid, the method comprising:
   determining a stator frequency error for the power generating asset;
   determining a torsional component and a stator component of the stator frequency error, wherein the torsional component corresponds to a drivetrain torsional vibration frequency;
   generating, via a drivetrain damping module of a controller, a damping power command configured to damp torsional vibrations resulting from a transient grid event, wherein the damping power command is generated in response to the drivetrain torsional vibration frequency;
   detecting, via the controller, an oscillation in a power output of the power generating asset following the transient grid event;
   in response to detecting the oscillation, storing at least a portion of the oscillation in the power output in an energy storage device operably coupled to the power generating asset; and
   determining, via the controller, at least one control command for the power generating asset, based, at least in part, on the damping power command.

2. The method of claim 1, further comprising:
   changing an operating state of the power generating asset in response to the at least one control command so as to output a grid forming voltage and frequency.

3. The method of claim 1, further comprising:
   determining, via a frequency module, a power output requirement for the power generating asset based, at least in part, on the stator component of the stator frequency error; and
   combining, via the frequency module, the power output requirement with the damping power command to develop a consolidated power requirement for the power generating asset, wherein the damping power command is generated in response to the drivetrain torsional vibration frequency.

4. The method of claim 1, wherein the stator frequency error comprises a difference between a reference frequency and a stator output frequency.

5. The method of claim 3, wherein determining the at least one control command for the power generating asset further comprises:
   determining, via the controller, a rotor voltage setpoint based, at least in part, on the consolidated power requirement.

6. The method of claim 4, further comprising:
   monitoring, via the controller, a three-phase stator voltage and current of the power generating asset;
   transforming the three-phase stator voltage and current via an abc to dq transfer module of the controller to a d q reference frame so as to determine a d component and a q component for the current and voltage; and
   determining, via a phase locked loop module of the controller, the stator output frequency.

7. The method of claim 6, wherein the stator component of the stator output frequency comprises a DC value, and wherein the torsional component of the stator output frequency comprises a sinusoidal frequency.

8. The method of claim 7, wherein determining the torsional component and the stator component of the stator frequency error further comprises:
   establishing, via a frequency module, a gain value of zero at the torsional vibration frequency; and
   establishing, via the frequency module, a non zero gain value for values of the stator frequency error which do not correspond to the torsional vibration frequency.

9. The method of claim 8, wherein the nonzero gain value has a maximal value when the stator frequency error has a minimal value and decreases with an increase in the stator frequency error.

10. The method of claim 8, further comprising:
    determining, via a voltage module of the controller, a stator voltage error for the power generating asset, the stator voltage error comprising a difference between a reference voltage and a stator-output voltage, wherein the stator-output voltage is the q component of the stator voltage; and
    determining, via the voltage module, a required rotor voltage d component based, at least in part, on the stator voltage error.

11. The method of claim 10, wherein determining the at least one control command for the power generating asset further comprises:
    determining, via the frequency module, a required rotor voltage q component based, at least in part, on the consolidated power requirement; and
    combining, via a dq to abc transform module of the controller, the required rotor voltage d component and the required rotor voltage q component to generate a rotor voltage setpoint.

12. The method of claim 10, further comprising:
    receiving, via the controller, the reference frequency, wherein the reference frequency corresponds to an output frequency of the power generating asset required to support the frequency of the power grid; and
    receiving, via the controller, the reference voltage, wherein the reference voltage corresponds to an output voltage magnitude of the power generating asset required to support the power grid.

13. A system for operating a power generating asset so as to provide grid forming control, the system comprising:
- a double fed generator connected to a power grid; and
- a controller communicatively coupled to the generator, the controller comprising at least one processor and a plurality of modules configured to perform a plurality of operations, the plurality of operations comprising:
  - determining a stator frequency error for the power generating asset;
  - determining a torsional component and a stator component of the stator frequency error, wherein the torsional component corresponds to a drivetrain torsional vibration frequency;
  - generating, via a drivetrain damping module of the controller, a damping power command configured to damp torsional vibrations resulting from a transient grid event, wherein the damping power command is generated in response to the drivetrain torsional vibration frequency;
  - detecting an oscillation in a power output of the generator following the transient grid event;
  - in response to detecting the oscillation, storing at least a portion of the oscillation in the power output in an energy storage device operably coupled to the generator;
  - determining at least one control command for the generator, based, at least in part, on the damping power command; and
  - changing an operating state of the generator in response to the at least one control command so as to output a grid forming voltage and frequency.

14. The system of claim 13, further comprising:
- determining, via a frequency module, a power output requirement for the power generating asset based, at least in part, on the stator component of the stator frequency error; and
- combining, via the frequency module, the power output requirement with the damping power command to develop a consolidated power requirement for the power generating asset, wherein the damping power command is generated in response to the drivetrain torsional vibration frequency.

15. The system of claim 14, wherein determining the at least one control command for the generator further comprises:
- determining a rotor voltage setpoint based, at least in part, on the consolidated power requirement.

16. The system of claim 14, wherein the plurality of operations further comprise:
- monitoring a three-phase stator voltage and current of the generator;
- transforming the three-phase stator voltage and current via an abc to dq transfer module of the controller to a d q reference frame so as to determine a d component and q component for the current and voltage; and
- determining, via a phase locked loop module of the controller, a stator output frequency.

17. The system of claim 16, wherein the stator component of the stator output frequency comprises a DC value, and wherein the torsional component of the stator output frequency comprises a sinusoidal frequency.

18. The system of claim 17, wherein determining the torsional component and the stator component of the stator frequency error further comprises:
- establishing, via the frequency module, a zero gain value at the torsional vibration frequency; and
- establishing, via the frequency module, a non zero gain value for values of the stator frequency error which do not correspond to the torsional vibration frequency.

19. The system of claim 18, wherein the plurality of operations further comprise:
- determining, via a voltage module of the controller, a stator voltage error for the generator, the stator voltage error comprising a difference between a reference voltage and a stator-output voltage, wherein the stator-output voltage is the q component of the stator voltage; and
- determining, via the voltage module, a required rotor voltage d component based, at least in part, on the stator voltage error.

20. The system of claim 19, wherein determining the at least one control command for the generator further comprises:
- determining, via the frequency module, a required rotor voltage q component based, at least in part, on the consolidated power requirement; and
- combining, via a dq to abc transform module of the controller, the required rotor voltage d component and the required rotor voltage q component to generate a rotor voltage setpoint.

* * * * *